United States Patent
Miyamae (10) Patent No.: US 9,585,375 B2
(45) Date of Patent: Mar. 7, 2017

(54) SYSTEM AND METHOD FOR REMOTE OPERATION OF ELECTRIC FISHING REELS

(71) Applicant: Miyamae Co., Ltd., Osaka (JP)

(72) Inventor: Toshiaki Miyamae, Osaka (JP)

(73) Assignee: MIYAMAE CO., LTD., Osaka (JP)

( * ) Notice: Subject to any disclaimer, the term of this patent is extended or adjusted under 35 U.S.C. 154(b) by 0 days.

(21) Appl. No.: 14/812,470

(22) Filed: Jul. 29, 2015

(65) Prior Publication Data

US 2016/0100044 A1    Apr. 7, 2016

(30) Foreign Application Priority Data

Oct. 2, 2014    (JP) .................................. 2014-203640
Jan. 29, 2015    (JP) .................................. 2015-014999

(51) Int. Cl.
*A01K 99/00*    (2006.01)
*H04W 4/00*    (2009.01)
(Continued)

(52) U.S. Cl.
CPC ............ *A01K 99/00* (2013.01); *A01K 89/017* (2013.01); *H04M 1/72533* (2013.01);
(Continued)

(58) Field of Classification Search
CPC   H04M 1/72527; H04M 1/725; A01K 89/017; A01K 99/00; H04L 45/026;
(Continued)

(56) References Cited

U.S. PATENT DOCUMENTS 8,736,438 B1 *    5/2014   Vasquez ................. B60R 25/24
                                                340/426.11
2007/0274233 A1 *   11/2007   Ptashek ................... H04L 67/16
                                                370/254
(Continued)

FOREIGN PATENT DOCUMENTS

JP          H07-87864       4/1995
JP          2001-161235     6/2001
(Continued)

*Primary Examiner* — Kamran Afshar
*Assistant Examiner* — Nicole Louis-Fils
(74) *Attorney, Agent, or Firm* — Thompson Hine LLP (57) ABSTRACT

A method and system for remote operation of at least one electric fishing reel by radio communication with a communication terminal having a radio communication module. The at least one electric fishing reel includes a radio communication module compatible with the command terminal radio communication module. The communication terminal carries an application that transmits a command through a user interface to control the at least one electric fishing reel. The at least one electric fishing reel transmits to the communication terminal a connection request signal, together with a device ID, at startup of the program. The communication terminal transmits to the electric fishing reel having the device ID a connection permit signal upon receiving the connection request signal such that a communication protocol connection is established between the communication terminal and the electric fishing reel.

14 Claims, 7 Drawing Sheets

(51) Int. Cl.
*H04W 76/02* (2009.01)
*H04W 76/06* (2009.01)
*A01K 89/01* (2006.01)
*H04M 1/72* (2006.01)
*A01K 89/017* (2006.01)
*H04L 12/751* (2013.01)
*H04M 1/725* (2006.01)

(52) U.S. Cl.
CPC ......... *H04W 4/008* (2013.01); *H04W 76/023* (2013.01); *H04W 76/06* (2013.01); *H04L 45/026* (2013.01); *H04M 1/7253* (2013.01)

(58) Field of Classification Search
CPC ... H04W 4/008; H04W 76/023; H04W 76/06; H04W 4/00
USPC ......... 455/418–419, 556; 242/323; 43/16–21
See application file for complete search history.

(56) References Cited

U.S. PATENT DOCUMENTS

| | | | | |
|---|---|---|---|---|
| 2009/0050725 | A1* | 2/2009 | Ikuta | A01K 89/015 242/323 |
| 2014/0195989 | A1* | 7/2014 | Choi | G08C 23/04 715/863 |
| 2015/0143736 | A1* | 5/2015 | Zdroik | A01K 97/01 43/17 |
| 2015/0342169 | A1* | 12/2015 | Zeevi | A01K 85/08 43/4.5 |

FOREIGN PATENT DOCUMENTS

| | | |
|---|---|---|
| JP | 2004-065071 | 3/2004 |
| JP | 2005-218354 | 8/2005 |

\* cited by examiner

SYSTEM AND METHOD FOR REMOTE OPERATION OF ELECTRIC FISHING REELS

TECHNICAL FIELD

This disclosure relates to systems and methods for remote operation of a motorized fishing reel, and more particularly, to methods and systems for wireless remote operation of a fishing reel that is driven by an electric motor to reel.

BACKGROUND

Electric fishing reels in which the reel is controlled by a remote control are known. For example, such electric fishing reels having a radio link between the reel and a remote control are described in Japanese Unexamined Patent Application Publications Nos. 7-87864, 2001-161235, 2004-65071, and 2005-218354, the disclosures of each being incorporated herein by reference.

Wirelessly remote operating an electric fishing reel is especially advantageous when a fisherman goes fishing alone. In a professional fishing operation, a fisherman must do everything, including operating a reel, steering a fishing boat, and watching a fish finder. The use of a remote controllable reel allows the fisherman to focus on fishing while performing other operations.

The advantage of a radio remote control operation is more apparent when multiple reels are used simultaneously. For example, the aforementioned Japanese Unexamined Patent Application Publication No. 2004-65071 discloses the technique in which a single remote control operates multiple reels.

The aforementioned Japanese Unexamined Patent Application Publication No. 2005-218354 discloses a technique in which a remote control terminal displays a variety of information on a real-time basis, including an operational status of a reel and a warning to the fisherman, alerting him to anything that could possibly reduce a fish catch. The fisherman may timely learn the operational status of the reel by watching an image displayed on the remote control terminal at hand. If any problem takes place, the fisherman may take appropriate action to control it.

It is known to provide a remote control that displays the status of a reel as necessary by remote controlling an electric fishing reel. In such systems, a specialized remote control is used. Manufacturers of electric fishing reels are obliged to invest capital to build a facility to manufacture the specialized remote control separate from the fishing reel body. If the specialized remote controls are respectively supplied together with the reel bodies, production yield increases, and costs per remote control are decreased. However, a person fishing as a hobby may not necessarily use a remote control. In general selling practice, the specialized remote control is sold separately from the reel body.

The specialized remote control is typically different from reel type to reel type, and from manufacture to manufacturer. Users may be satisfied with the reel body, but may not be satisfied with the user-friendliness of the remote control. This limits the option of the user in the selection of reels.

Cellular phones or a smart phones, currently in widespread use as a mobile communication terminal, commonly are provided with not only a basic communication function but also a Wi-Fi module and/or Bluetooth module. The cellar phone or the smart phone may thus communicate with external devices, such as PC peripheral devices including a personal computer, and external devices including a headphone or a microphone wirelessly by radio communication. In particular, the smart phone or a tablet terminal, each having an OS and programs called "applications" installed thereon, may process data at speeds comparable to that of a personal computer. Recent efforts have been made to develop a system in which even home appliances and automobiles are remote operated using a smart phone.

SUMMARY

In an embodiment, a mobile communication terminal, such as a smart phone, not only being mobile but also having computing speed comparable to that of a standard personal computer, is incorporated in a system for remote control of one or more electric fishing reels. An advantage of such a system is that the reel manufacture is free from capital investment for the facility producing a specialized remote control. The user, typically a fisherman, also benefits from this system because the user may use his or her already owned mobile terminal, such as a smart phone. The problems associated with the specialized remote control are all eliminated.

The disclosed remote operation system has been developed in view of the above problems, and an advantage is to provide a system that remote operates an electric fishing reel using a mobile terminal in widespread use, such as a smart phone.

In an embodiment the electric fishing reel may include a reel body and a radio communication module, in the reel body, that complies with at least one of the Wi-Fi specification and Bluetooth specification. The reel body may communicate with a communication terminal having a radio communication module corresponding to the radio communication module of the electric fishing reel. The reel body may receive an instruction signal (i.e., a command) transmitted from the mobile terminal, and in response to the received instruction signal, remotely and wirelessly controls functions of the electric fishing reel, which may include controlling a motor to reel in a fishing line, to stop retrieving or reeling in the fishing line, to reel out the fishing line, to display data on a liquid crystal display (LCD), to output audio, and record a variety of data and log. Optionally, a command used in the remote operation may be set by the user.

In Wi-Fi or Bluetooth communications between the reel and the mobile terminal, a pairing operation between the two devices may need to be performed in advance (which may include device registration to establish a communication protocol connection). To this end, a unique device identification code may be allocated to the reel body in advance, and the mobile terminal may be caused to read the device identification code to establish the communication protocol connection.

The device identification code typically may include a random numerical value, and may be manually input on the mobile terminal during the pairing operation. Alternatively, the device identification code may be recorded in a bar code attached to the reel body, and the mobile terminal may be caused to read the bar code. The mobile terminal then may read the bar code. The mobile terminal thus easily reads the device identification code without the need to manually enter the device identification code.

The reel body may include a display, such as an LCD or an organic electroluminescent display (ELD), and transmit image information displayed on the display to the mobile terminal via the radio communication module. In this way, the user may check the status of the reel body by viewing the display of the mobile terminal at hand. The image information may be transmitted in whole or in part.

The electric fishing reel may transmit the notification signal via the radio communication module to the mobile terminal if the reel body is in an operational error thereof and/or at the end of an operation thereof. The mobile terminal notifies the user of the status of the reel body using image displaying, an audio output, and vibration motion on a real-time basis.

The disclosed remote operation system for an electric fishing reel may remote operate the electric fishing reel via radio communications with a communication terminal having a radio communication module complying with a near field communication specification and/or Wi-Fi specification for digital devices. The electric fishing reel may include a radio communication module corresponding to the radio communication module of the communication terminal. The communication terminal stores a program installed thereon. The program selects a command to control the electric fishing reel with a user interface and transmits the command to the electric fishing reel. The electric fishing reel transmits to the communication terminal a connection request signal together with a device ID of the electric fishing reel at startup of the program on the communication terminal, and the communication terminal transmits to the electric fishing reel having the device ID a connection permit signal upon receiving the connection request signal such that a communication protocol connection is established between the communication terminal and the electric fishing reel. The communication terminal and the electric fishing reel thereafter mutually keep exchanging keep-alive signals until the program ends.

In the disclosed remote operation system, once the electric fishing reel is switched on and the communication terminal starts up the program, the communication protocol connection is automatically established with the communication terminal and the electric fishing reel in a mutually communicable state. Since the remote operation system has a keep-alive function, communication resumes by re-starting the program on the communication terminal in case communication should be disconnected because of electromagnetic interference, for example. The electric fishing reel could be typically uncontrollable in the communication shutdown caused in this way. In accordance with the present invention, however, the communication connection resumes quickly to restart fishing before a fish school disperses.

The electric fishing reel re-transmits the keep-alive signal to the communication terminal if the communication terminal fails to reply to the keep-alive signal from the electric fishing reel. The electric fishing reel transmits the connection request signal to the communication terminal if the communication terminal fails to reply to the re-transmitted keep-alive signal. The communication connection is thus reliably maintained.

The communication terminal transmits a request signal requesting the keep-alive signal to the electric fishing reel if the communication terminal does not receive the keep-alive signal. The communication terminal performs a communication disconnection operation if the electric fishing reel fails to reply to the request signal. In this way, a fault may be detected early by checking the electric fishing reel subsequent to a communication disconnection.

The communication scheme may comply with the Bluetooth specification or the Wi-Fi specification. If the communication scheme incorporates packet communication, only a small amount of transmission data may be sufficient to communicate a command, which may enable the receiver side to process the received data more efficiently. As described below, if the instructions embodied in the packet communication are performed remotely on multiple electric fishing reels, the time required to ping all the electric fishing reels and to exchange data may be relatively short. Without loss of time, all the electric fishing reels may be wirelessly remote operated concurrently.

In an embodiment, the mobile terminal may be a smart phone. A communication module, which may be a Wi-Fi module, a Bluetooth module, or contain both modules, may be included as standard. By simply installing the specialized program on the smart phone, the smart phone may be used as a remote control for one or more electric fishing reels. The smart phone is in widespread use and a user is likely to be familiar with operating it. Providing a system that may incorporate such a smart phone frees a manufacturer of electric fishing reels from having to manufacture a specialized remote control for its electric fishing reels. In embodiments, the communication terminal may transmit the same instruction signal concurrently to any number $\underline{N}$ of electric fishing reels.

In embodiments, the "near-field radio communication specification" refers to a radio communication specification for a communication coverage that may range from several meters to several tens of meters, and the Bluetooth specification is one of the most widely accepted specifications currently available. However, the near-field radio communication specification is not limited to the Bluetooth specification.

If the radio communication module is a Bluetooth module, the device identification code may be a PIN code held by the Bluetooth module. "PIN" stands for Personal Identification Number, and the PIN code may also be referred to as a passkey, an authentication key, or a password. The Bluetooth module may include a circuit board having a radio antenna and the like mounted thereon or integral therewith and have a PIN code including any character string of 4 through 16 digits allocated on a per-module basis. By inputting the PIN code to a connection target device (the mobile terminal in the disclosed system) for reading, a communication protocol connection may be established in accordance with a profile such generic access profile (GAP). The use of the PIN code as the device identification code of the electric fishing reel may eliminate the need to set up the device identification code separately, and the communication protocol connection may be established with the mobile terminal through the generic access profile.

More specifically, the communication terminal may establish the communication protocol connection with each of the $\underline{N}$ electric fishing reels in accordance with the PIN code, allocates any new device name to each of the N electric fishing reels independently of the PIN code, and remote operates the $\underline{N}$ electric fishing reels in accordance with the device names. If Bluetooth communication is performed with multiple devices having the same model name, the same model names may be concurrently displayed on the mobile terminal, which may cause the user to have difficulty in discriminating one electric fishing reel from another. In one embodiment of the disclosed system, each of the $\underline{N}$ electric fishing reels having established the communication protocol connection in accordance with the PIN codes may be given a unique device name by the user, which is inputted independently of the PIN code. The user may thus easily discriminate between electric fishing reels currently in communication with the communication terminal. It is also possible to allocate and register the PIN code of an electric fishing reel as a device name.

The communication terminal may be a mobile terminal and does not require telephone functionality. In an embodiment, the communication terminal may be a cellular phone or a smart phone. A communication module capable of using Wi-Fi or Bluetooth communication protocols may be included as a standard feature on such a communication terminal. By simply installing the specialized program on the smart phone, the smart phone may be used as a remote control for one or more of the electric fishing reels. Smart phones are in widespread use and users typically are used to operating smart phones. Accordingly, the disclosed system frees a manufacturer of electric fishing reels from having to manufacture a specialized remote control for the electric fishing reels.

In embodiments, the reel body may include a radio communication module complying with at least one of the Wi-Fi specification and Bluetooth specification, which may be located in the reel body, and the reel body may communicate with a mobile terminal having a compatible radio communication module. That way, the mobile terminal may remotely operate the reel body. This may eliminate the need for a specialized remote control. By providing the disclosed system, which may employ a smart phone as a mobile terminal, the user may to use his or her own smart phone as the mobile terminal. The user is therefore freed from the additional costs associated with having to purchase a specialized remote control. The user is used to operating his or her own smart phone. By simply installing the specialized program on the user's smart phone, the user may select an electric fishing reel to be remotely operated from a wide selection of electric fishing reels without being limited by a manufacturer's specifications for its reels.

DETAILED DESCRIPTION

Figure 1:
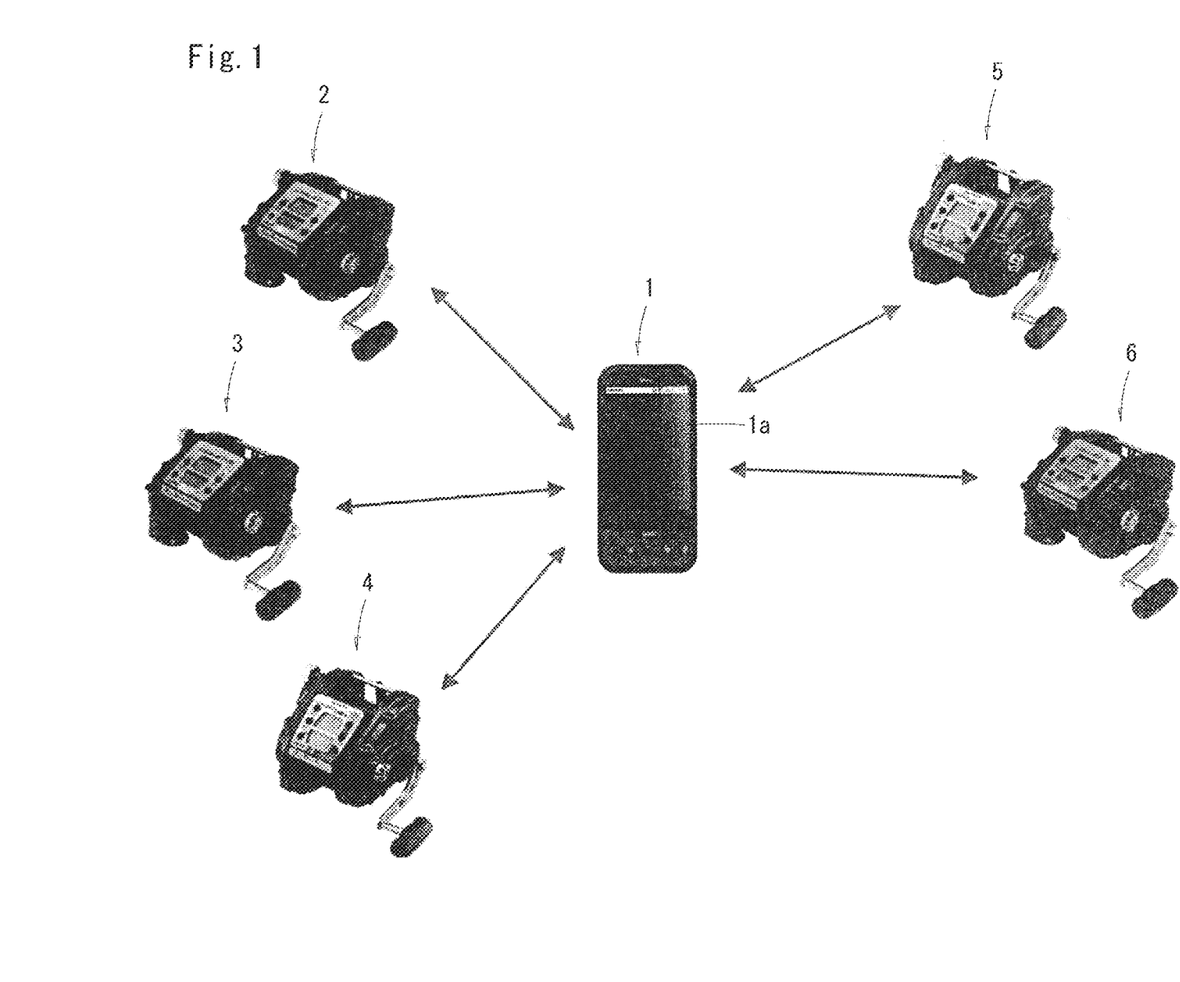
FIG. 1 is a schematic diagram generally illustrating a system for the remote operation of electric fishing reels in accordance with a described embodiment.

FIG. 1 is a schematic diagram generally illustrating an embodiment of the disclosed remote operation system of an electric fishing reel. FIG. 1 illustrates a communication terminal, which may take the form of a smart phone 1, and electric fishing reels 2, 3, 4, 5, and 6. In embodiments, the communication terminal may be selected from a cellular phone, a smart phone, a tablet, and a laptop computer. The smart phone 1 may include a touchscreen 1*a* serving as an input device and a display device. The smart phone 1 also may include an internal CPU and memory (neither of which is illustrated), and a radio communication module that may comply with a short range communication protocol, such as Wi-Fi and/or Bluetooth (a registered trademark of Bluetooth SIG, Inc., Kirkland, Wash.). The operating system (OS) of the smart phone 1 may be pre-installed in memory, and individual programs (also referred to applications or apps) supported by the OS may be installed on the smart phone 1.

A specialized program configured to operate the electric fishing reels 2 through 6 may be installed on the smart phone 1. The contents of the specialized program may be identical to a motor control program of each of the electric fishing reels 2 through 6. More specifically, each of the electric fishing reels 2 through 6 also may include a CPU and memory, and execute a motor control program. By executing the motor control program, each of the electric fishing reels 2 through 6 may be controlled to operate to set a shelf location, to reel in a fishing line in response to fish biting (load), and/or to display these pieces of information. Such control may be possible by directly operating a variety of switches disposed in the reel body. However, the user also may control the electric fishing reels 2 through 6 in accordance with the disclosed specialized program using the smart phone 1.

Each of the electric fishing reels 2 through 6 may include at least one of Wi-Fi and/or Bluetooth modules (not illustrated) as a specific unit to remote operate the electric fishing reels 2 through 6 with the smart phone 1. The smart phone 1 wirelessly communicates with the electric fishing reels 2 through 6 in accordance with the Wi-Fi and/or Bluetooth connection. In an embodiment, the user may, at the user's discretion, choose whether to use the Wi-Fi connection or the Bluetooth connection to communicate with, and receive feedback from, one, more, or all of the electric fishing reels 2 through 6 with their smart phone 1.

The Wi-Fi connection may be appropriate for high-capacity communication, but an access point may be needed to connect the smart phone 1 to the Internet, and may incur communication costs. On the other hand, the Bluetooth connection may not be appropriate for high-capacity communication, but may not need an access point, and may offer an advantage of permitting direct pairing with a partner device, such as electric fishing reels 2 through 6. Furthermore, the Bluetooth connection may outperforms Infrared Data Association (IrDA) protocols (infrared) in that the Bluetooth connection is usable if an interfering object is present within a communication coverage of 10 meters. The Bluetooth connection consumes less power than IrDA, and involves manufacturing costs lower than IrDA.

The radio communication between the smart phone 1 and the electric fishing reels 2 through 6 may be based on the premise that each of the electric fishing reels may be tagged with a device identification code unique to that electric fishing reel. The communication protocol connection with the electric fishing reels 2 through 6 may be established by causing the smart phone 1 to read the device identification code.

Figure 2:
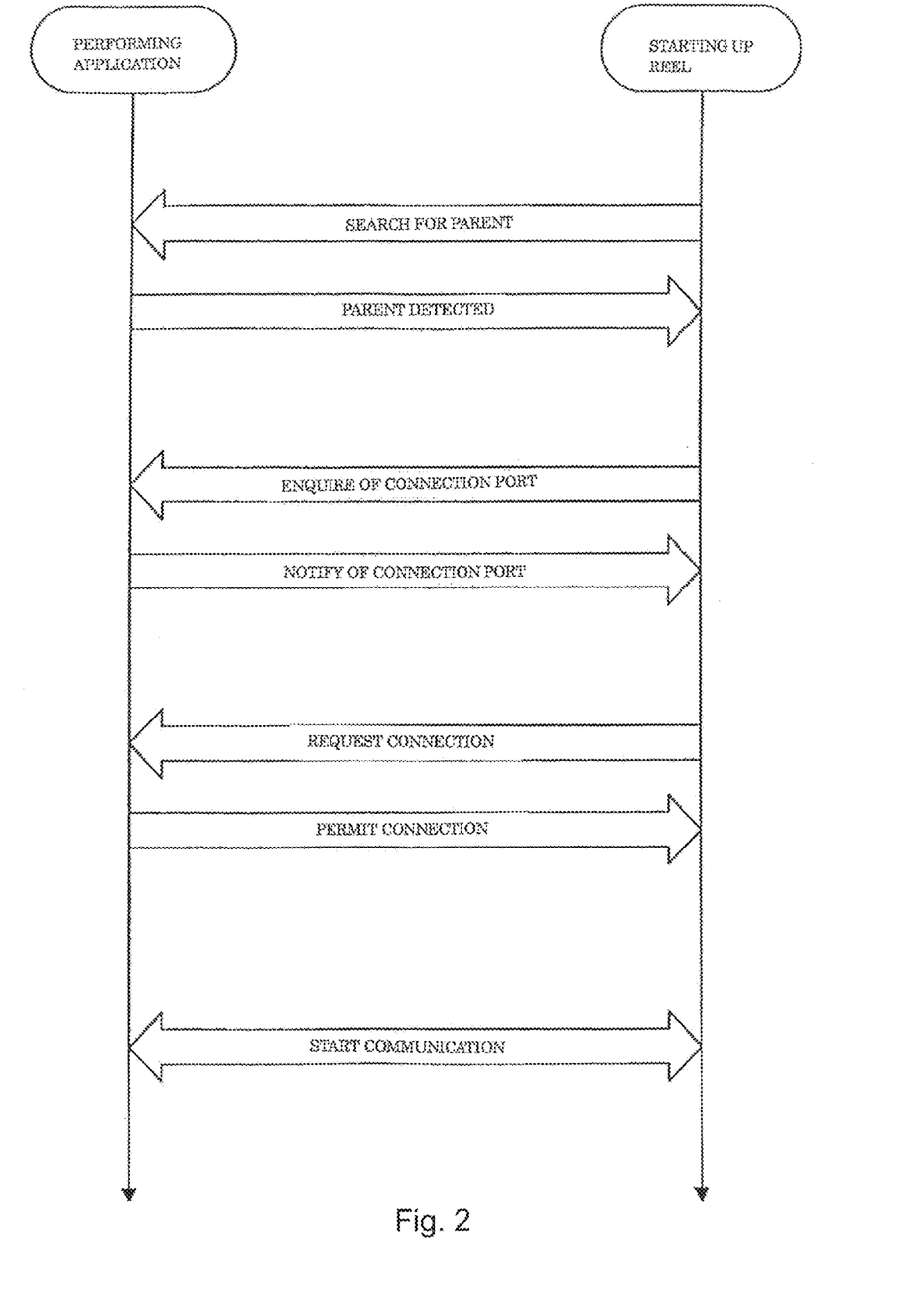
FIG. 2 illustrates an establishing procedure of the communication protocol connection of the remote operation system of FIG. 1.

FIG. 2 illustrates a procedure for establishing a communication protocol connection between, for example, the electric fishing reel 2 and the smart phone 1 (see FIG. 1). The smart phone 1 may be switched on, and automatically may start up (i.e., execute) a specialized program. The electric fishing reel 2 also may be switched on. The reel 2 may first search for the smart phone 1 (i.e., the parent device). If the smart phone 1 responds and the reel 2 detects the parent device, the reel 2 may transmit a connection request signal to the smart phone 1. In response to the connection request signal, the smart phone 1 may transmit a "connection permit" signal to the reel 2. The communication protocol between the smart phone 1 and electric fishing reel 2 thus may be established.

FIG. 2 illustrates a procedure for establishing a communication protocol connection using Bluetooth, wherein a request for a connection port from the reel 2 to the smart phone 1 is not needed. With another communication protocol, a request for a connection port and a port notification may be made between the detection of the smart phone 1 (parent device) and the connection request of the electric fishing reel 2.

Figure 3:
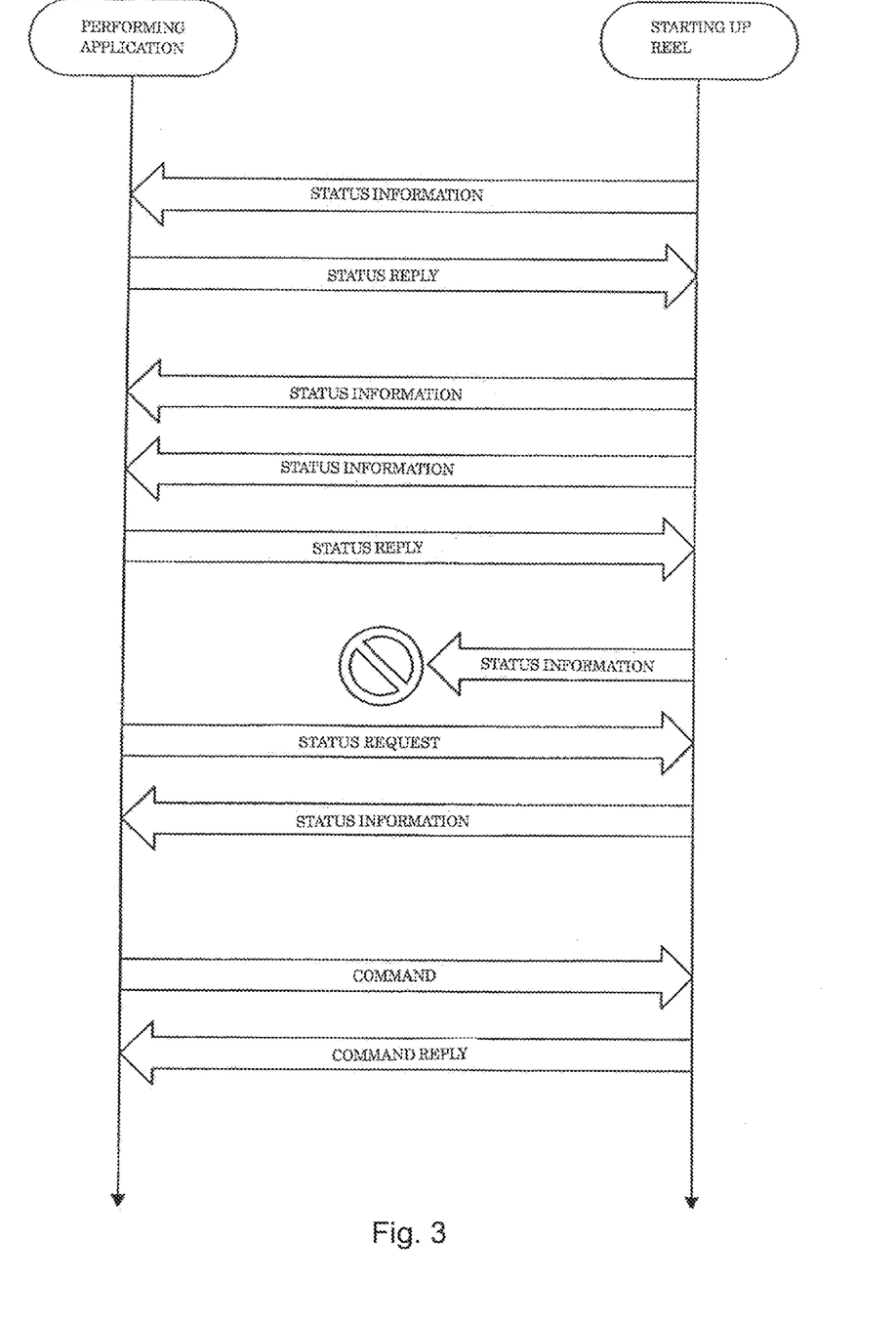
FIG. 3 illustrates a keep-alive state of the remote operation system of FIG. 1.

With the communication protocol connection established, the smart phone 1 and the reel 2 mutually exchange keep-alive signals periodically and the smart phone 1 transmits a command to remote operate the reel 2. FIG. 3 illustrates a communication process. Referring to FIG. 3, the keep-alive signals may be labeled "status information" from the reel 2 and a "status reply" from the smart phone 1 (see FIG. 1). Command signals may be labeled a "command" from the smart phone 1 and a "command reply" from the reel 2.

In an embodiment, the reel 2 may transmit to the smart phone 1 the status information as a keep-alive signal. Upon receiving the status information, the smart phone 1 may verify that the reel 2 is in a connected state ready to be operated remotely and wirelessly. Since the smart phone 1 may display the status information on a screen thereof, the user may continuously watch the status of the reel 2.

If the smart phone 1 fails to reply to the status information from the reel 2, in other words, if the reel 2 fails to receive the status reply from the smart phone 1, the reel 2 may re-transmit the status information to the reel 2 as illustrated in FIG. 3. If the connection is maintained, the communication may be disconnected because of a transient fault in the communication environment, such as electromagnetic interference (EMI). If the smart phone 1 does not reply to the re-transmitted signal from the reel 2, the communication may be disconnected. As illustrated in FIG. 2, the reel 2 may transmit a connection request signal to establish the communication protocol connection again.

If the smart phone 1 is unable to receive the status information from the reel 2, the smart phone 1 may transmit a status request signal to the reel 2 as illustrated in FIG. 3. If the reel 2 does not reply to the request signal, the reel 2 may be considered to be in a fault mode, which may include a problem in communication status. The smart phone 1 may perform a communication disconnection operation with the reel 2. The communication with the reel 2 may thus be fully disconnected as a result. If no fault is detected after checking the reel 2, the smart phone 1 may attempt to establish the communication protocol connection again.

Figure 4:
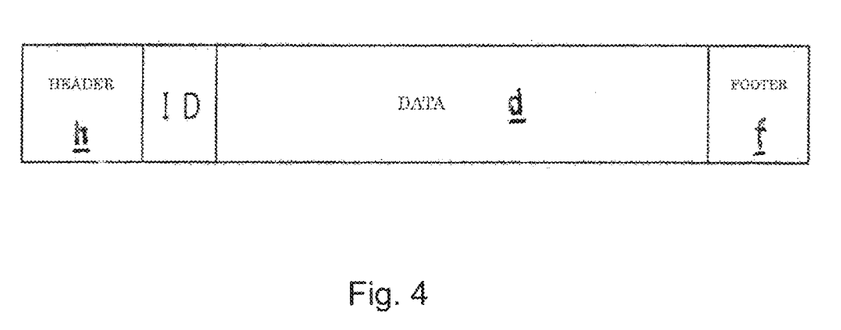
FIG. 4 illustrates a data structure (packet structure) of the remote operation system of FIG. 1.

The variety of signals illustrated in FIG. 2 and FIG. 3, including all of the status information, the status reply, the status request, the command, and the command reply may be organized as packet data as illustrated in FIG. 4. The basic packet structure may include a header h, a device ID unique to each one of the electric fishing reels 2 through 6, data d, and a footer f. In the packet communication, an amount of data may be set to be about 20 bytes, and is almost instantaneously transmitted and received between the smart phone 1 and the electric fishing reels 2 through 6 (see FIG. 1). The remote operation of the electric fishing reels 2 through 6 may be performed without loss of time, and the status information of each of the electric fishing reels may be displayed. Even if communication is made with multiple reels, no communication interference between reels may occur.

In this way, when the smart phone 1 transmits an instruction signal, the smart phone 1 also may broadcast the device identification code, and is thus enabled to remote operate an operator-selected one of the electric fishing reels 2 through 6 tagged with that code. Conversely, when information is transmitted from one of the electric fishing reels 2 through 6 to the smart phone 1, the device identification code from that one of the electric fishing reels also may be transmitted so that the smart phone 1 recognizes which of the electric fishing reels 2 through 6 has transmitted the information. In accordance with the embodiment, five electric fishing reels, namely, the electric fishing reels 2 through 6, are used. If the number of electric fishing reels is one, two, three, four, five, six, or more, the pairing operation performed using the disclosed device identification code remains unchanged.

On the other hand, in order to cause the smart phone 1 to read the device identification code, the device identification code may be written in numerical value on a product label. In such a case, the numerical value may be manually entered into the smart phone 1 by a fisherman or other user. However, time may be required to input the numerical value, and further an input error may occur with manual entry. There is also a possibility that a third person may use the code in an unauthorized fashion. In an embodiment, the device identification code may be embodied in a bar code (not illustrated) attached to or imprinted on the reel body, for example. If the smart phone 1 includes a camera function, the smart phone may photograph the bar code and a bar code reading application that may be either incorporated into the OS, or may be an app loaded into the smart phone, may read the device identification code embodied in the bar code.

In sum, in one embodiment the disclosed system for remote operation of electric fishing reels that incorporates a communication terminal (e.g., smart phone 1) having a display and a first radio communication module complying with a near-field radio communication specification and/or Wi-Fi specification for digital devices, may include at least one electric fishing reel 2 through 6 having a second radio communication module compatible with the first radio communication module of the communication terminal; and a program adapted to be installed on the communication terminal, the program having a user interface and capable of selecting a command to control the at least one electric fishing reel by transmitting the command to the second radio communication module of the at least one electric fishing reel; wherein second radio communication module of the at least one electric fishing reel is capable of transmitting to the communication terminal a connection request signal together with a device ID of the electric fishing reel at startup of the program on the communication terminal, and the communication terminal is capable of transmitting to the at least one electric fishing reel having the device ID a connection permit signal upon receiving the connection request signal such that a communication protocol connection is established between the communication terminal and the at least one electric fishing reel, and wherein the communication terminal and the at least one electric fishing reel thereafter each exchange keep-alive signals until the program ends.

Figure 5:
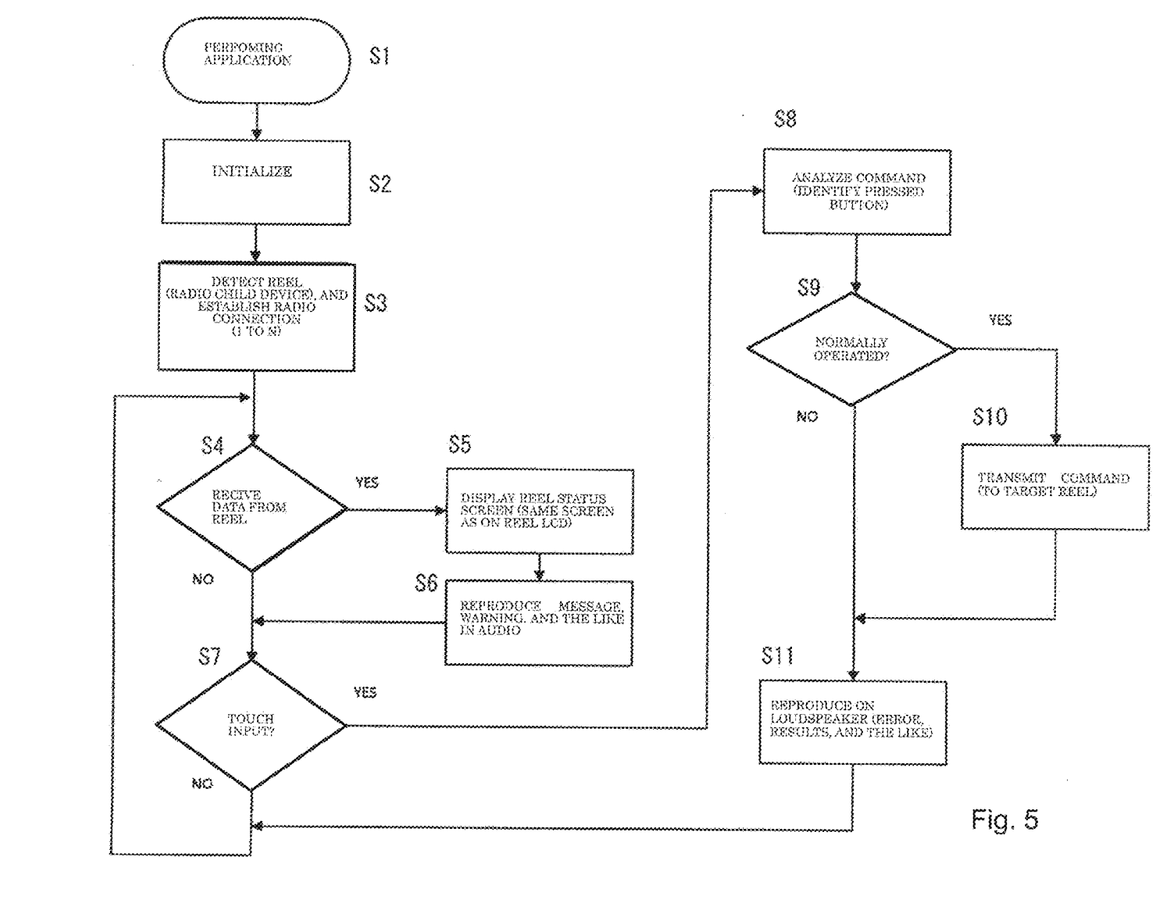
FIG. 5 is a flowchart illustrating a process of remote operation of the remote operation system of FIG. 1.

FIG. 5 is a flowchart illustrating a process of wireless operation of the remote operation system. In step S1, the user may switch on the smart phone 1 and run an application for remote operation of a selected one or more of the electric fishing reels 2 through 6 from among applications installed on the smart phone (see FIG. 1). In step S2, the smart phone 1 may initialize the application installed on the smart phone. In step S2, a screen requesting that the device identification code be input is displayed, so that the user may perform the pairing operation or operations with a selected one or more of the electric fishing reels 2 through 6 (see also FIG. 6). In step S3, the communication protocol connection or connections between the smart phone 1 and the selected one or more of the electric fishing reels 2 through 6 may be established in accordance with the input device identification codes of the electric fishing reels 2 through 6. Once the communication protocol connection or connections is or are established with the selected one or more electric fishing reels 2 through 6, that status may be saved and thus steps S2 and S3 are skipped in process.

The communication protocol connection may be established as follows. In preparation for the remote operation, the smart phone 1 may determine whether information indicating the status of each of the selected electric fishing reels 2 through 6 has been received (step S4). This information may be the same image information received from the electric fishing reels 2 through 6 and displayed on a display, if the electric fishing reels 2 through 6 each include an liquid crystal display (LCD) or an organic electroluminescent display (ELD). The image information may be displayed on the touchscreen 1a (see FIG. 1) of the smart phone 1 (step S5). In addition to displaying the image information, information about the status of the reel and the presence or absence of any fault may be indicated by one or more of a message, an audible sound, or a vibration displayed on or generated by the smart phone 1 (step S6).

If it is determined in step S4 that no data has been received from an electric fishing reel of the selected one or more of the electric fishing reels 2 through 6, or subsequent to steps S5 and S6, the smart phone 1 determines that no input (operation) has been entered on the touchscreen 1a on the smart phone 1 (step S7) in order to perform remote operation of the electric fishing reels 2 through 6, then processing returns to step S4. In the alternative, if it is determined that an input has been entered on the touchscreen 1a, a command as the input is analyzed (step S8). It is then determined whether the input (operation) is normal (step S9). If the input is a normal command, the instruction signal is transmitted to the reel (step S10). By transmitting the device identification code, the command is transmitted to the one of the electric fishing reels 2 through 6 having the command allocated thereto. The same command may be transmitted to the remaining selected one or more of the electric fishing reels 2 through 6 that has or have established the communication protocol connection (broadcast function).

Each of the selected electric fishing reels 2 through 6 having received the instruction signal in step S10 starts an operation responsive to the received command. For example, the fishing line may be cast and the distal end of the fishing line reaches a shelf or the bottom of the sea, lake or other body of water being fished. A spool in each of the selected electric fishing reels 2 through 6 then may be shifted from a free rotation state to a clutched state ready to reel in the fishing line. To reel in the fishing line, the motor of the reel may be started, and then stops at an appropriate timing. To adjust retrieve or reel-in speed, the motor speed may be adjusted to a set speed during the retrieve operation.

Figure 6:
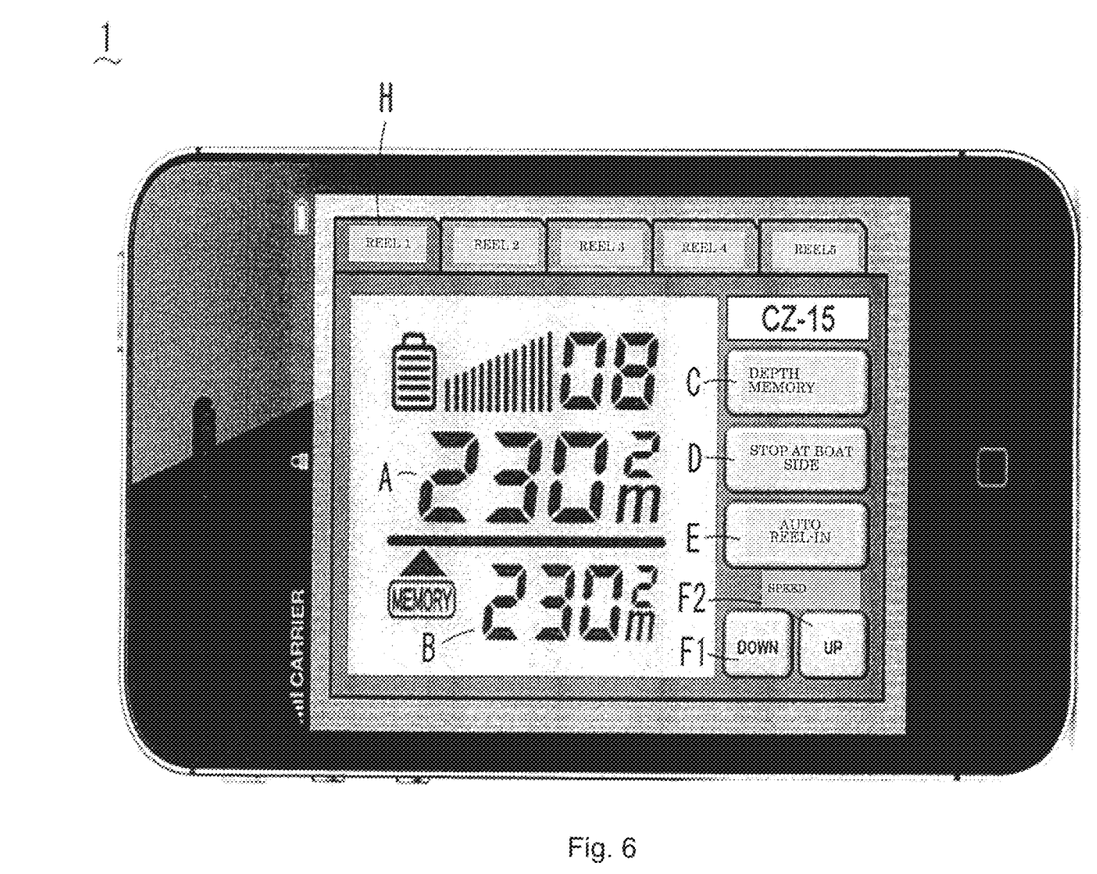
FIG. 6 is a schematic illustration of an image displayed during the startup of an application in a smart phone of the remote operation system of FIG. 1.

FIG. 6 illustrates a display example of the touchscreen 1a (FIG. 1) while the remote operation specialized application is starting up on the smart phone 1. In this display example, a check screen to display the reel status includes a depth screen A indicating a reel-out length of the fishing line from the reel. A shelf depth B is displayed below the depth screen A. A display screen of commands to generate instruction signals to the reel is displayed on to the right of the check screen and includes a depth memory C selectable by tapping, a stop at boat side D, an auto reel-in E, and speed settings F1 and F2. An antenna screen G as an indicator of the communication state with the reel is disposed above the depth screen A. The display screen is prepared for each of the electric fishing reels 2 through 6, and by tapping a tag H at the top of the display screen, the display screen is switched for one reel to another of the selected ones of electric fishing reels 2 through 6.

Figure 7:
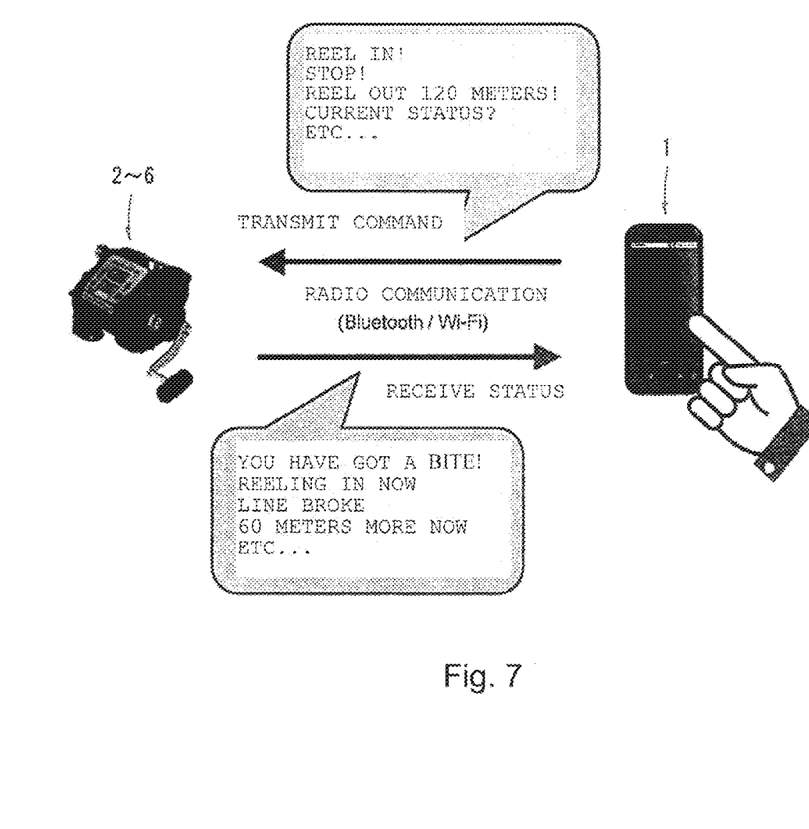
FIG. 7 is a schematic illustration of showing an example of transmission of information and commands between a smart phone and the electric fishing reel of the remote operation system of FIG. 1.

If an operation result is obtained in the remote operation in step S10 (see FIG. 5) or a fault is detected during the operation of one or more of the selected ones of the electric fishing reels 2 through 6, a notification signal (status) may be received from one or more of, or each of the electric fishing reels 2 through 6. The smart phone 1 thus may alert the user to the fault using one or more of the image display, the audible sound, or the vibration of the smart phone 1 (step S11). FIG. 7 illustrates a notification example using the audio or message. Processing returns to step S4 to repeat the steps until the application is terminated.

In the configuration and process of the embodiment of the present invention, the smart phone 1 as the remote terminal or mobile terminal may take the form of a cellular phone (i.e., a cell phone), a tablet or other type of hand-held device, or a laptop. In an embodiment, the mobile terminal may be one or both of a Wi-Fi module and Bluetooth module. The number of electric fishing reels that may be operated by the disclosed system is not limited to five. The number of reels may be one, two, three, four, six, or more than six. In an embodiment, one or more of, or each of, the electric fishing reels 2 through 6 may include one or both of a Wi-Fi module or Bluetooth radio communication module, may have a unique device identification code, and may establish the communication protocol connection with the mobile terminal, such as the smart phone 1.

The mobile terminal may be provided with a touchscreen, but may be of a type in which a display and an input device (e.g., a keyboard) may be separated from each other. In an embodiment, the mobile terminal may generate an instruction signal in response to an input command, transmit the instruction signal to a selected one or more of the electric fishing reels 2 through 6, and cause a selected one or more of the electric fishing reels to execute a commend. The mobile terminal may receive status information from a selected one or more of the electric fishing reels 2 through 6, display the status information on the display, and alert the user using an audio signal or by vibrating. With the remote control program installed, the mobile terminal may wirelessly operate the selected one or more of the electric fishing reels 2 through 6 more effectively and easily, but the contents of the program are not limited.

If the Bluetooth module is used as a radio communication module, the PIN code of each module may be used conveniently as the device identification code of the electric fishing reels 2 through 6. After establishing the communication protocol connection (S3 in FIG. 5), any device name may be newly attached to each of the electric fishing reels 2 through 6 separate from the PIN code or a model name. The user (via the mobile terminal) may easily identify which reel is going to be operated or is now operated by viewing the device name displayed on the mobile device. The device name may be displayed in the "reel 1 through reel 5" at the tag H in FIG. 6. In the case of boat fishing, the device names may be, for example, "port 1 through port 3" and/or "starboard 2 through starboard 3" depending on the reel locations on the boat.

In sum, in one embodiment, a method for remote operation of electric fishing reels may incorporate a communication terminal (e.g., smart phone 1) having a display and a first radio communication module complying with a near-field radio communication specification and/or Wi-Fi specification for digital devices may include installing a program on the communication terminal, the program having a user interface and capable of selecting a command to control at least one electric fishing reel by transmitting the command to a second radio communication module of the at least one electric fishing reel; transmitting to the communication terminal a connection request signal together with a device ID of the at least one electric fishing reel 2 through 6 at startup of the program on the communication terminal; and transmitting to the at least one electric fishing reel having the device ID a connection permit signal upon receiving the connection request signal such that a communication protocol connection is established between the communication terminal and the at least one electric fishing reel.

While the methods and forms of apparatus disclosed and described herein constitute preferred embodiments of the remote operation system for electric fishing reels, it is to be understood that the scope of the disclosure is not limited to these precise methods and forms of apparatus, and that changes may be made therein without departing from the scope of the disclosure.

What is claimed is:

1. A system for remote operation of electric fishing reels that incorporates a mobile communication terminal having a display and a first radio communication module complying with one of a near-field radio communication specification and a Wi-Fi specification for digital devices, the system comprising:
    at least one electric fishing reel having a second radio communication module compatible with the first radio communication module of the mobile communication terminal, the second radio communication module for executing a motor control program to operate the at least one electric fishing reel; and
    a program adapted to be installed on the mobile communication terminal, the program having a user interface and capable of selecting a command and transmitting the command to the second radio communication module of the at least one electric fishing reel, wherein the second radio communication module executes the motor control program based on the command to operate the at least one electric fishing reel;
    wherein the second radio communication module of the at least one electric fishing reel is configured to transmit to the mobile communication terminal a connection request signal together with a device identification (ID) of the electric fishing reel at startup of the program on the mobile communication terminal, and the mobile communication terminal is configured to transmit to the at least one electric fishing reel having the device ID a connection permit signal upon receiving the connection request signal such that a communication protocol connection is established between the mobile communication terminal and the at least one electric fishing reel, and wherein the mobile communication terminal and the at least one electric fishing reel thereafter each exchange, via the first and the second radio communication module, keep-alive signals until the program ends.

2. The system according to claim 1, wherein the at least one electric fishing reel re-transmits the keep-alive signal to the mobile communication terminal if the mobile communication terminal fails to reply to the keep-alive signal from the electric fishing reel, and the at least one electric fishing reel transmits the connection request signal to the mobile communication terminal if the mobile communication terminal fails to reply to the re-transmitted keep-alive signal.

3. The system according to claim 1, wherein the mobile communication terminal transmits a request signal requesting the keep-alive signal to the at least one electric fishing reel if the mobile communication terminal fails to receive the keep-alive signal, and the mobile communication terminal performs a communication disconnection operation if the electric fishing reel fails to reply to the request signal.

4. The system according to claim 1, wherein the keep-alive signal transmitted from the at least one electric fishing reel includes status information of the electric fishing reel, and the mobile communication terminal displays, on the display, the status information included in the keep-alive signal received thereby.

5. The system according to claim 1, wherein a radio communication scheme used between the mobile communication terminal and the at least one electric fishing reel is packet communication.

6. The system according to claim 1, further comprising a plurality of electric fishing reels, each of the plurality of electric fishing reels having a unique device identification (ID), wherein the mobile communication terminal remote operates individually each of the plurality of electric fishing reels in accordance with the unique device ID thereof.

7. The system according to claim 6, wherein the second radio communication module is a Bluetooth module, and the device ID is a personal identification number (PIN) code originally allocated to the Bluetooth module.

8. The system according to claim 7, wherein the mobile communication terminal establishes the communication protocol connection with each of the plurality of electric fishing reels in accordance with the PIN code associated with each of the plurality of electric fishing reels, associates a unique device name to each of the plurality of electric fishing reels independently of the PIN code, and remotely controls each of the plurality of the electric fishing reels in accordance with the unique device name associated therewith.

9. The system according to claim 1, wherein the mobile communication terminal is selected from a cellular phone, a smart phone, a tablet, and a laptop computer.

10. The system according to claim 1, wherein the user interface of the program adapted to be installed on the mobile communication terminal displays status information from the at least one electric fishing reel.

11. The system according to claim 1, wherein the user interface of the program adapted to be installed on the mobile communication terminal alerts a user using one or more of a visual display, an audio signal or by vibrating.

12. A method for remote operation of electric fishing reels that incorporates a mobile communication terminal having a display and a first radio communication module complying with one of a near-field radio communication specification and a Wi-Fi specification for digital devices, the method comprising:
    installing a program on the mobile communication terminal, the program having a user interface and capable of selecting a command to control at least one electric fishing reel by transmitting the command to a second radio communication module of the at least one electric fishing reel, the second radio communication module for executing a motor control program to operate the at least one electric fishing reel;

transmitting to the mobile communication terminal a connection request signal together with a device identification (ID) of the at least one electric fishing reel at startup of the program on the mobile communication terminal;

transmitting to the at least one electric fishing reel having the device ID a connection permit signal upon receiving the connection request signal such that a communication protocol connection is established between the mobile communication terminal and the at least one electric fishing reel;

executing the motor control program by the second radio communication module based on the command to operate the at least one fishing reel; and exchanging keep-alive signals between the mobile communication terminal and the electric fishing reel, via the first and the second radio communication modules, until the program ends.

13. The system according to claim 1, wherein the second radio communication module executes the motor control program to set a shelf location of the at least one electric fishing reel and to reel in a fishing line in response to a load.

14. The method of claim 12, wherein the second radio communication module executes the motor control program to set a shelf location of the at least one electric fishing reel, and to reel in a fishing line in response to a load.

* * * * *